(12) United States Patent
Tanaka (10) Patent No.: US 8,414,131 B2
(45) Date of Patent: Apr. 9, 2013

(54) EYEGLASS-MOUNTABLE IMAGE DISPLAY DEVICE

(75) Inventor: Mitsugi Tanaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 492 days.

(21) Appl. No.: 12/585,659

(22) Filed: Sep. 21, 2009

(65) Prior Publication Data

US 2010/0026970 A1 Feb. 4, 2010

Related U.S. Application Data

(63) Continuation-in-part of application No. PCT/JP2008/055031, filed on Mar. 19, 2008.

(30) Foreign Application Priority Data

Mar. 26, 2007 (JP) .................................. 2007-080037

(51) Int. Cl.
*G03B 21/28* (2006.01)

(52) U.S. Cl.
USPC ........................................................... 353/81

(58) Field of Classification Search .................... 353/43, 353/81; 349/11; 359/13, 629, 630; 351/211
See application file for complete search history.

(56) References Cited

U.S. PATENT DOCUMENTS

| 5,430,620 | A | * | 7/1995 | Li et al. ........................ 362/572 |
| 5,886,822 | A | | 3/1999 | Spitzer |
| 6,023,372 | A | | 2/2000 | Spitzer et al. |
| 6,091,546 | A | | 7/2000 | Spitzer |
| 6,204,974 | B1 | | 3/2001 | Spitzer |
| 6,349,001 | B1 | | 2/2002 | Spitzer |
| 6,356,392 | B1 | * | 3/2002 | Spitzer ........................ 359/630 |
| 6,384,982 | B1 | | 5/2002 | Spitzer |
| 6,618,099 | B1 | | 9/2003 | Spitzer |
| 7,158,096 | B1 | | 1/2007 | Spitzer |
| 2004/0252077 | A1 | | 12/2004 | Terasaki |
| 2006/0203084 | A1 | | 9/2006 | Okazaki et al. |
| 2007/0103388 | A1 | | 5/2007 | Spitzer |

FOREIGN PATENT DOCUMENTS

| JP | A-08-036143 | | 2/1996 |
| JP | A-2000-112396 | | 4/2000 |
| JP | 2000249967 A | * | 9/2000 |
| JP | A-2000-249967 | | 9/2000 |
| JP | A-2001-522064 | | 11/2001 |
| JP | A-2002-539498 | | 11/2002 |
| JP | A-2003-502713 | | 1/2003 |
| JP | A-2003-046903 | | 2/2003 |

(Continued)

OTHER PUBLICATIONS

Japanese Patent Office, Notification of Reason for Refusal mailed Mar. 13, 2012 in Japanese Patent Application No. 2007-080037 w/English-language Translation.

*Primary Examiner* — Thanh Luu
*Assistant Examiner* — Danell L Owens
(74) *Attorney, Agent, or Firm* — Oliff & Berridge, PLC (57) ABSTRACT

The eyeglass-mountable image display device is an image display device which includes an image projection part and a clip which is mounted on the image projection part. The image projection part is held on eyeglasses by the clip which clamps a part of a lens portion of the eyeglasses from both surface sides of the lens portion.

13 Claims, 9 Drawing Sheets

FOREIGN PATENT DOCUMENTS

| | | |
|---|---|---|
| JP | A-2003-295128 | 10/2003 |
| JP | A-2005-043701 | 2/2005 |
| JP | A-2005-195822 | 7/2005 |
| JP | A-2006-253902 | 9/2006 |
| WO | WO 99/23525 A1 | 5/1999 |
| WO | WO 00/55676 A1 | 9/2000 |

\* cited by examiner

EYEGLASS-MOUNTABLE IMAGE DISPLAY DEVICE

CROSS-REFERENCE TO RELATED APPLICATIONS

The present application is a Continuation-in-Part of International Application No. PCT/JP2008/055031 filed on Mar. 19, 2008, which claims the benefit of Japanese Patent Application No. 2007-080037 filed on Mar. 26, 2007.

BACKGROUND

1. Field

The present invention relates to an image display device which allows a user to observe an image or the like with the image display device mounted on eyeglasses.

2. Description of the Related Art

Figure 11:
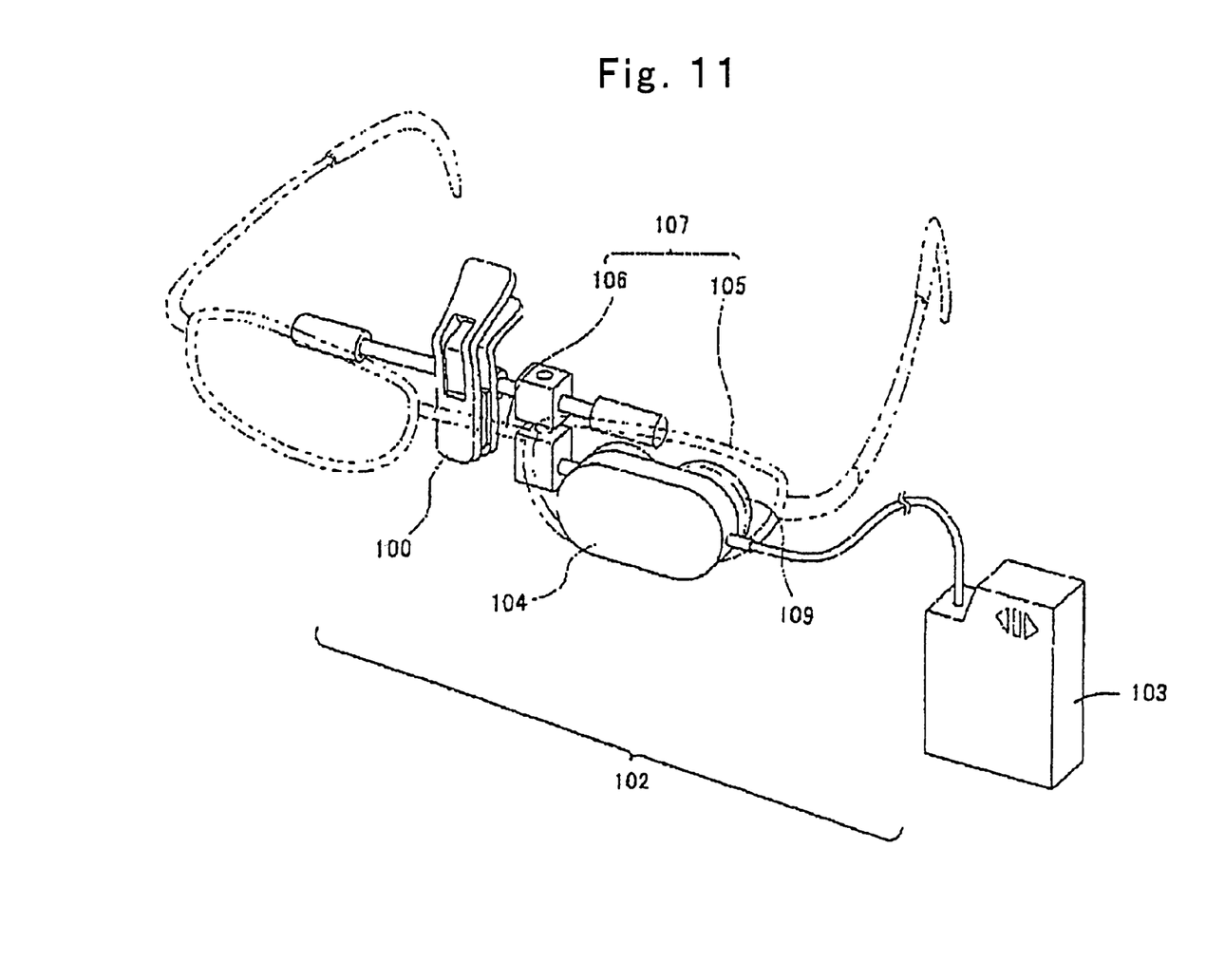
FIG. 11 is a perspective view of a known image forming apparatus in a state that the image forming apparatus is mounted on eyeglasses.

If a miniaturized display can be simply mounted on eyeglasses or the like of a user, the user could enjoy images at any place and hence, such a miniaturized display becomes convenient. To satisfy such a demand, there has been proposed a miniaturized image display device which directly projects an image on a retina of a user from a position near an eyeball of the user. For example, as shown in FIG. 11, there has been proposed an eyeglasses-mountable-type image forming apparatus. The image forming apparatus 102 is constituted of two separate parts, that is, an image information forming part 103 and a miniaturized display 104 formed of a liquid crystal display device. The miniaturized display 104 is mounted on one-lens-105 side of eyeglasses 107 using a mounting jig 100. A clip and a display holding part of the mounting jig 100 are connected to a shaft rod. The display 104 is held on the display holding portion. The mounting jig 100 is fixed to eyeglasses by clamping a frame 106 of the eyeglasses with the clip. Accordingly, the display 104 is fixed to the frame 106 by the clip by way of the display holding portion. Further, the display 104 also includes a suction portion which adheres by suction the display 104 to the lens 105 of the eyeglasses. Accordingly, the display 104 is fixed to the lens of the eyeglasses by suction.

Figure 12:
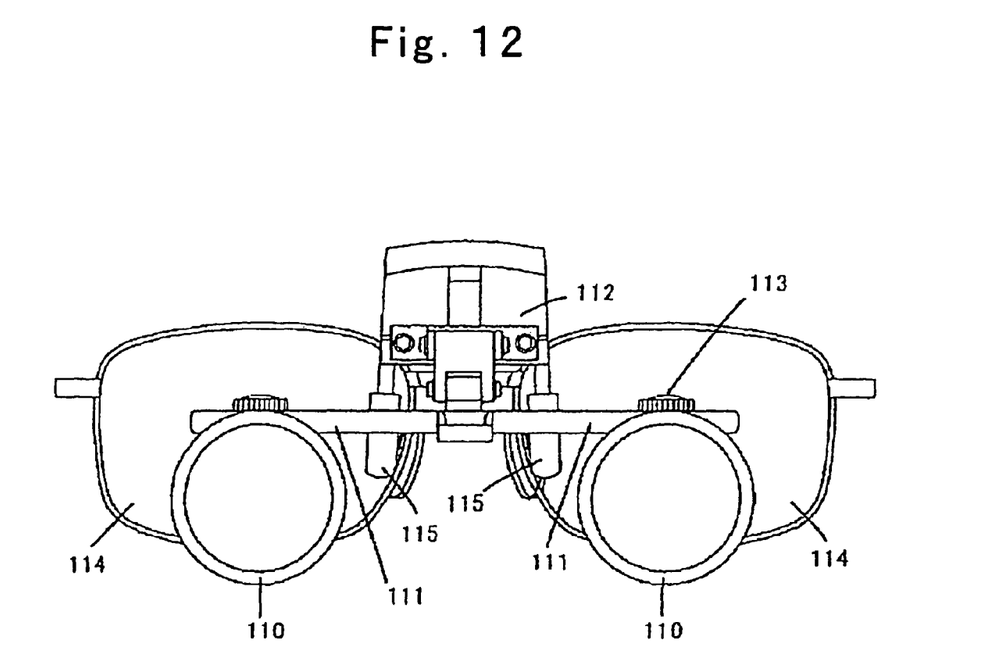
FIG. 12 is an overall front view of known magnifying glasses in a state that the magnifying glasses are mounted on the eyeglasses.

Further, there has been known a magnifying device (magnifying glass) which can be simply mounted on eyeglasses, although the magnifying device is not a display device. As shown in FIG. 12, two magnifying glasses 110 which constitute a binocular glass are fixed to both ends of a rod-shaped arm 111 respectively. A clip 112 is fixed to a center portion of the rod-shaped arm 111, and clip lugs 115 of the clip 112 clamp lenses 114 of the eyeglasses so that the magnifying device is fixed to the eyeglasses. Accordingly, the whole magnifying glasses 110 are held by the eyeglasses. Further, two magnifying glasses 110 are fixed to the arm 111 by screws 113, and these magnifying glasses 110 can be slid along the rod-shaped arm 111 by loosening the screws 113.

SUMMARY

It is extremely advantageous for the eyeglasses-mountable-type image display device if the display device could be easily mounted on the eyeglasses. On the other hand, the eyeglasses-mountable-type image display device has following drawbacks. That is, it is difficult to mount the image display device at an optimum position at a first attempt when a user mounts the image display device on the eyeglasses and the posture of the image display device mounted on the eyeglasses is liable to become easily unstable. In view of the above, if a position or an angle which allows the user to easily observe an image can be easily located or adjusted after mounting the image display device on the eyeglasses, the image display device becomes convenient in use.

However, with respect to the known eyeglasses-mountable-type image forming apparatus of the related art described in the above-mentioned patent document 1, the display is adhered by suction to the lens portion of the eyeglasses by way of the suction portion and, at the same time, the mounting jig which holds the display is fixed to the frame of the eyeglasses using the clip. Accordingly, in adjusting a position of the display mounted on the eyeglasses, the mere release of the clip cannot move the display. That is, the user has to take following steps to adjust the position of the display. The user has to remove the eyeglasses from his/her head and, thereafter, the lens is released from the suction portion with respect to the removed eyeglasses. Then, the user has to remove the clip from the frame and, thereafter, the user has to find a position suitable for mounting the display. Then, the user has to adhere by suction the suction portion to be fixed to the display at a position of the lens which is considered to be an appropriate position, and the user has to mount the mounting jig on the frame by the clip. That is, the known eyeglasses-mountable-type image forming apparatus has a drawback that the user cannot simply fix the display at an appropriate position of the eyeglasses while watching a projected image.

Further, in case of the binocular magnifying glass, a lens of the binocular eyeglasses in the vicinity of a connecting portion of both eyeglasses is clamped by the clip. Accordingly, the position of the clip is substantially fixed. For adjusting the magnifying glass at a proper position of the lens, the magnifying glass is released from the arm by rotating the screw, and the magnifying glass is moved along the arm. However, when the screw is released, the magnifying glass is released from the arm 111 so that the magnifying glass is inclined downwardly due to gravity unless no countermeasure is taken. Accordingly, the user has to perform a following operation using his/her both hands. That is, the user has to fix the magnifying glass by rotating the screw 113 with his/her one hand while supporting the magnifying glass with the other hand. That is, it is difficult for the user to set the magnifying glass on the eyeglasses at an appropriate position in a snap-fit manner while watching the magnifying glass.

According to one aspect of the present invention, there is provided an image display device which includes an image projection part which forms an image and projects the image on a retina, and a clip which is mounted on the image projection part, wherein the clip is configured to clamp a part of a lens portion of eyeglasses from a front surface side and a back surface side of the eyeglass so as to hold the image projection part.

BRIEF DESCRIPTION OF THE DRAWINGS

FIG. 9 is a perspective view for explaining a switching mechanism of the image display device, wherein

FIG. 10 is an explanatory view for explaining switching of mounting of the image display device from a left eye side to a right eye side, wherein

DETAILED DESCRIPTION

The present invention is explained hereinafter in detail in conjunction with attached drawings.

Figure 1:
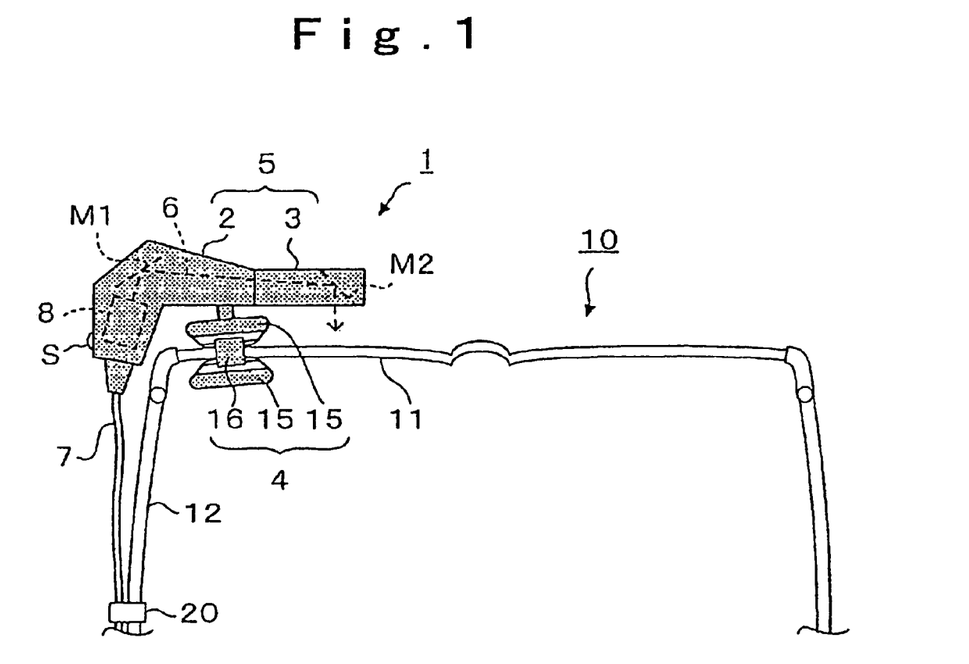
FIG. 1 is a schematic plan view of an image display device according to an embodiment of the present invention in a state that the image display device is mounted on eyeglasses.

As shown in FIG. 1, an image display device 1 (being explained as a monocular image display device in this embodiment) is constituted of an image projection part 5 which generates an image and projects the image on a retina of a user, and a clip 4 mounted on the image projection part 5. The image projection part 5 is held on and fixed to the eyeglasses 10 by clamping a part of a lens portion of the eyeglasses 10 with the clip 4 from a front surface side and a back surface side of the eyeglasses 10. The image projection part 5 is constituted of an image forming part 2 which forms an image, and a prism 3 which introduces the formed image therein and projects the image on a retina of a user not shown in the drawing. The image forming part 2 includes an image scanning part 8 which converts video signals received via a lead line 7 into scanning beams 6, reflection surfaces M1 and M2 which reflect the scanning beams 6 generated by conversion, a changeover switch S which changes over an angle of an image to be projected and the like. The scanning beams 6 are generated by the image scanning part 8, are reflected on reflection surfaces M1, M2, and are projected on a retina of a user. By fixing the lead line 7 to a temple 12 of the eyeglasses 10 by a fastening jig 20, mounting stability of the image display device 1 mounted on the eyeglasses 10 can be further enhanced.

Figure 2:
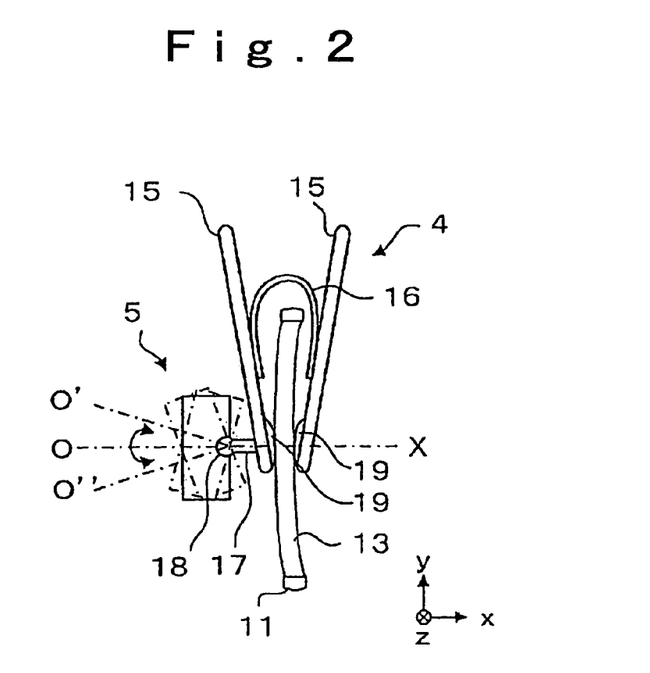
FIG. 2 is a schematic side view of the image display device according to the embodiment of the present invention as viewed from a right eye side.

As shown in FIG. 2, the clip 4 is constituted of two clip lugs 15. An elastic body 19 made of rubber or the like is formed on a contact portion which forms a distal end portion of each clip lug 15 and is brought into contact with a lens portion 13 of the eyeglasses 10. Two clip lugs 15 are jointed to each other by a spring 16 so that a stress is imparted to the clip lugs 15 in directions that the clip lugs 15 clamp the lens portion of the eyeglasses 10 by way of two contact portions thereof from both surface sides. The image forming part 2 of the image projection part 5 and the clip 4 are connected to each other by a connecting portion 17. The connecting portion 17 is connected to the image forming part 2 by a ball joint 18. The ball joint 18 has degrees of freedom in three axes (namely, movability of three degrees of freedom). That is, the ball joint 18 is rotatable about a perpendicular O which passes through the center of the ball joint 18, and is tiltable in the y direction as well as in the z direction. Due to such a constitution, it is possible to easily adjust the direction or the inclination of a projected image projected from the prism 3. Here, the spring 16 is not limited to a plate-shaped spring and a coil-shaped spring may be used as the spring 16. Further, a part which connects the connecting portion 17 with the image forming part 2 is not limited to the ball joint 18, and the movability of three degrees of freedom may be acquired by a universal joint or the like.

Further, the elastic bodies 19 of the contact portions of the clip lugs 15 are brought into contact with the lens portion 13 of the eyeglasses 10 in a sandwiching manner, and the contact portions and the connecting portion 17 are arranged adjacent to each other. In the image display device 1 shown in FIG. 2, all of the center of the ball joint 18, a center axis of the connecting portion 17 and the contact portion are substantially arranged on an X axis. Due to such arrangement, a rotation moment about the X axis can be decreased and hence, the posture of the image display device 1 mounted on the eyeglasses 10 becomes stable. Further, by adopting the constitution where the center of gravity of the image display device 1 is positioned above the X axis or the constitution where the center of gravity of at least the image projection part 5 is substantially positioned above the X axis, it is possible to almost completely eliminate the rotation moment about the X axis. Due to such a constitution, the mounting of the image display device 1 on the eyeglasses 10 and the fine adjustment of the position of the image display device 1 are facilitated and, further, the posture of the image display device 1 after mounting the image display device 1 on the eyeglasses 10 becomes more stable.

Figure 3:
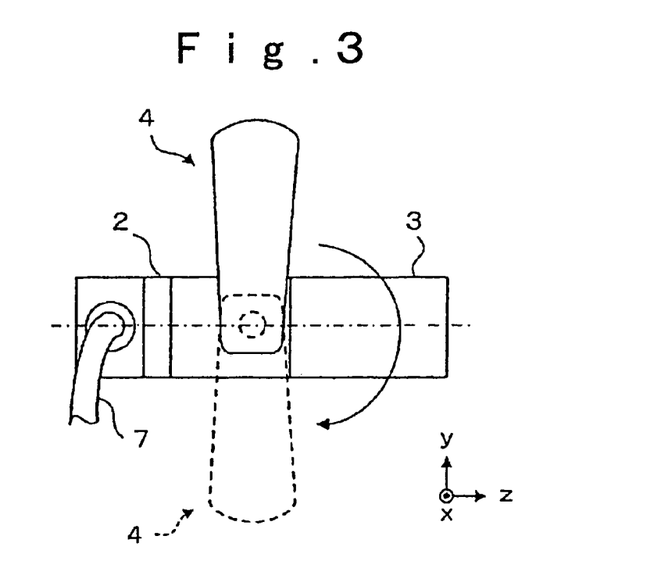
FIG. 3 is a schematic back view of the image display device according to the embodiment of the present invention as viewed from a user side.

As shown in FIG. 3, the lead line 7 which is provided for inputting image signals is connected to the image forming part 2. The clip 4 is rotatably mounted on the image forming part 2. Accordingly, it is possible to easily rotate the clip 4 as shown in FIG. 3.

Figure 4A:
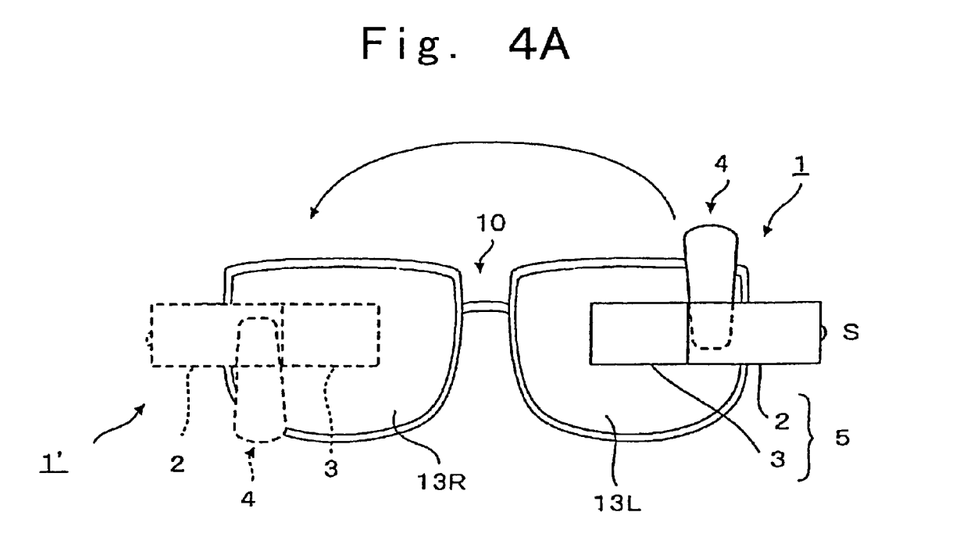
FIG. 4 is a schematic front view of the image display device according to the embodiment of the present invention in a state that the image display device is mounted on the eyeglasses, and also is an explanatory view for explaining an operation for changing mounting of the image display device mounted on a left eye side to a right eye side.

As shown in FIG. 4(a), the image display device 1 indicated by a solid line is mounted on a left eye side of the eyeglasses 10. The prism 3 of the image display device 1 is positioned substantially at the center of a left-eye-side lens portion 13L, and projects an image toward a retina of a user on a back side of a surface of paper on which the FIG. 4 is drawn. A user can easily perform the positional adjustment of the prism 3 by pinching and moving the clip lugs 15 with his/her fingers or by pinching and adjusting an inclination angle of the image projection part 5 with his/her fingers.

Figure 4B:
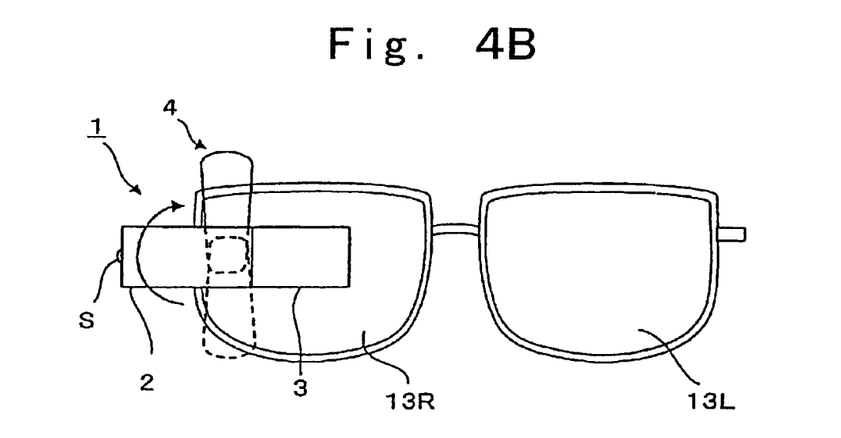

Next, a broken line 1' in FIG. 4(a) indicates the posture that the image display device 1 assumes when the image display device 1 is moved to a right-eye-side lens portion 13R from the left-eye-side lens portion 13L about a perpendicular which is perpendicular to a surface of paper on which the FIG. 4 is drawn and constitutes a rotary axis. In this state, the clip 4 is arranged at a position on an oblique lower right side of the right-eye-side lens portion 13R. Further, a projected image becomes an inverted image. Since the clip 4 shields an oblique-lower-right-side viewing field of the user, an operation of the user is further restricted. For example, when the user walks while watching an image on the image display device 1, the user can hardly grasp a road condition on an oblique lower right side of the user. Accordingly, the user can hardly walk in the oblique right frontward direction. In view of the above, in restricting a viewing field of the user, it is desirable to position the clip 4 such that the clip 4 is arranged at an upper portion of the right-eye-side lens portion 13R as much as possible. For this end, as indicated by a solid line shown in FIG. 4(b), the clip 4 is rotated by 180° so that the clip 4 clamps the right-eye-side lens portion 13R downwardly from above. In this manner, in the image display device 1 according to this embodiment, the clip 4 which is rotatably mounted on the image projection part 5 constitutes a switching mechanism which changes over a use mode between a mode where the image display device is used in a state that the image display device 1 is mounted on a left eye side of the eyeglasses 10 and a mode in which the image display device 1 is used in a state that the image display device 1 is mounted on a right eye side of the eyeglasses 10. Due to such a constitution, the user can extremely easily move and mount the image display device 1 from one side to the other side.

Further, when the user pushes the changeover switch S, an image formed by the image forming part 2 is rotated by 180° so as to change over the image into an upright image. Accordingly, the changeover switch S constitutes the switching mechanism which changes over a use mode between a mode where the image display device is used in a state that the image display device is mounted on the left eye side of the eyeglasses 10 and a mode in which the image display device is used in a state that the image display device is mounted on the right eye side of the eyeglasses 10. Accordingly, the image display device can be mounted on either one of the left eye side and the right eye side of the eyeglasses 10 so that the user can observe the same upright image.

Figure 5:
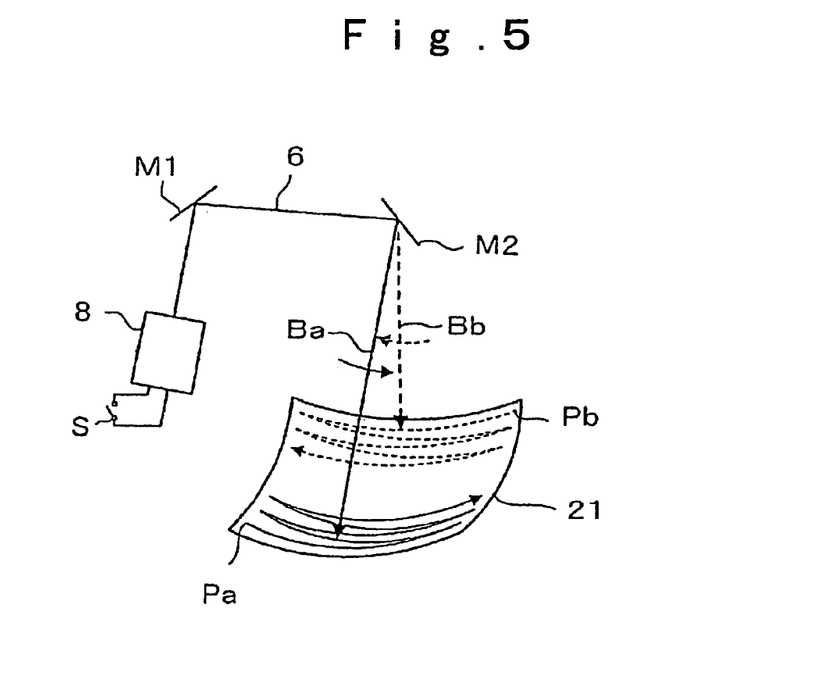
FIG. 5 is an explanatory view for explaining the inversion of an image in the image display device according to the embodiment of the present invention.

As shown in FIG. 5, scanning beams 6 projected from an image scanning part 8 arranged in the image projection part 5 are reflected on the reflection surface M1 and the reflection surface M2 in the image projection part 5, and are radiated to a retina 21 of a user. On the retina 21, horizontal scanning and vertical scanning are performed with scanning beams Ba from a scanning start point Pa. On the other hand, when the changeover switch S is turned on, the scanning direction of the scanning beams 6 is reversed. As the result, horizontal scanning and vertical scanning are performed with scanning beams Bb such that the scanning starts from a scanning start point Pb. Such scanning direction may be reversed by shifting a phase of oscillations of the oscillation mirror or the Galvano mirror by 180° with respect to the image signals, for example. Due to such an operation, the projection image can be rotated by 180°. The manner of rotation of the image projected on the retina 21 is not limited to the above-mentioned manner. That is, the image can be rotated at an arbitrary angle by conversion processing which converts image signals.

Further, the rotation of the clip 4 and the operation of the changeover switch S may be interlocked with each other. For example, the rotation of the clip 4 and the operation of the changeover switch S may be interlocked such that, when the clip 4 is rotated from a position indicated by solid lines in FIG. 3 to a position indicated by broken lines in FIG. 3, the changeover switch S is turned on in an interlocking manner with such rotation. Due to such an operation, when the clip 4 is rotated, the projected image is also automatically reversed. Due to such a constitution, the user can easily mount the image display device on either side of the eyeglasses without being conscious of the inversion of the image.

In the above-mentioned embodiment, the explanation has been made with respect to an example in which a retinal scanning display is used as the image projection part 5 of the image display device 1. However, the present invention is not limited to such a retinal scanning display, and can use a transmissive or reflective display device such as a liquid crystal display element as the image projection part 5. Further, in the above-mentioned embodiment, a part of a lens portion of the eyeglasses 10 is clamped by the clip. However, the eyeglasses 10 may have a transparent plate in place of the lens, and the transparent plate may be clamped by the clip. Further, the image forming apparatus may be mounted on sunglasses, and a color light transmitting plate of the sunglasses may be clamped by the clip. When dummy plates are mounted on a frame of eyeglasses without using lenses to allow the use of eyeglasses with naked eyes, such a dummy plate may be clamped by the clip. In the present invention, "part of the lens portion" is a general concept which includes these parts.

Figure 6:
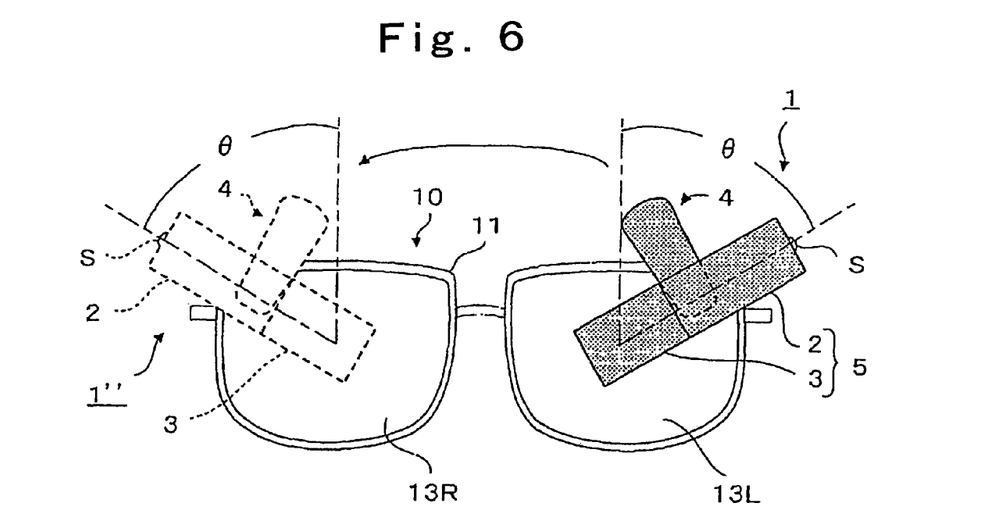
FIG. 6 is a schematic view showing another application example of the image display device according to the embodiment of the present invention.

As shown in FIG. 6, the image display device 1 is mounted on the left-eye-side lens portion 13L obliquely at an angle $\theta$. Assume that an upright image is projected on a retina of a user with the image display device 1 mounted on the eyeglasses obliquely. The image display device 1 can be mounted on the right-eye-side lens portion 13R by moving the image display device 1 to a position where the image display device 1 assumes the posture indicated by a broken line 1". Here, the image display device is rotated about a rotary axis which is formed of a perpendicular with respect to a surface of a paper showing the drawing. Accordingly, by rotating the image display device 1 by 180°, the clip 4 assumes the posture indicated by a broken line 1". Further, when the changeover switch S is pushed, the projected image which is projected by the image projection part 5 can be rotated by $2\theta$. Accordingly, even after the image display device 1 is moved, the image display device 1 can project an upright image. Although the angle $\theta$ may be set to an arbitrary value, it is particularly preferable to set the angle $\theta$ to 45° for facilitating a change of inclination of the image. Further, the changeover switch S may set the angle $\theta$ not only at one angle but also at many angles.

Further, in the image display device 1 shown in FIG. 6, when the inclination angle $\theta$ of the image projection part 5 is set to 0°, the switching of the image display device 1 between the left eye side and the right eye side requires neither the rotation of the clip 4 nor the rotation of the projection image. Accordingly, it is unnecessary to provide the switching mechanism for changing over a use mode between a mode where the image display device 1 is used in a state that the image display device 1 is mounted on the left eye side of the eyeglasses 10 and a mode where the image display device 1 is used in a state that the image display device 1 is mounted on the right eye side of the eyeglasses 10.

Figure 7:
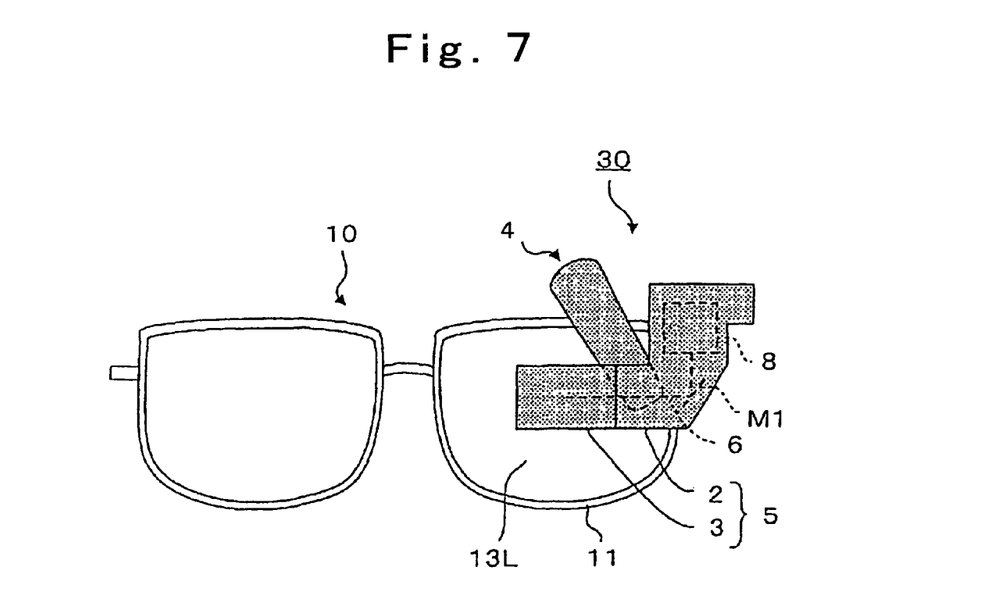
FIG. 7 is a schematic front view of an image display device according to another embodiment of the present invention in a state that the image display device is mounted on eyeglasses.
Figure 8:
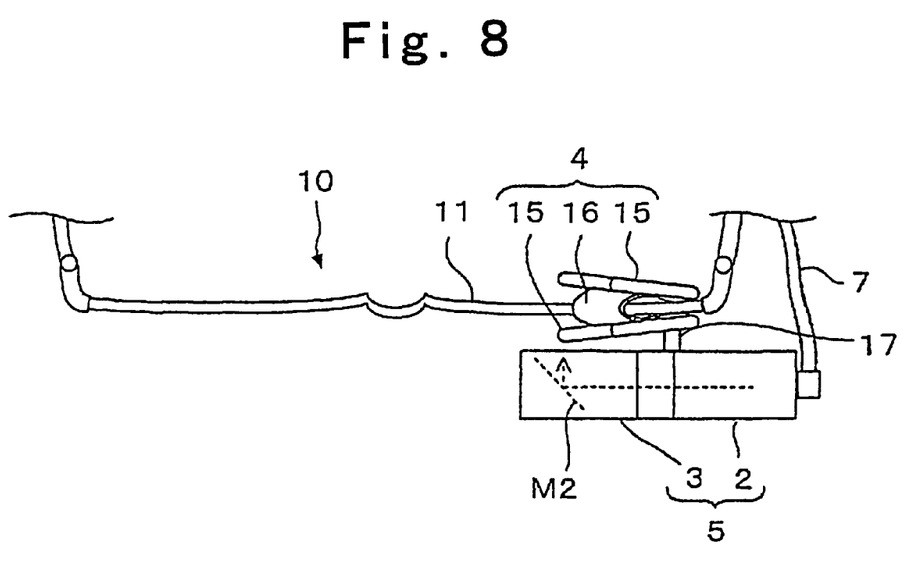
FIG. 8 is a schematic plan view of the image display device according to another embodiment of the present invention in a state that the image display device is mounted on the eyeglasses.

In FIG. 7 and FIG. 8, the image display device 30 has an approximately Z shape as viewed from a user side. The image display device 30 is constituted of an image projection part 5 which projects an image in response to inputted image signals, and a clip 4 which is mounted on the image projection part 5. The image display device 30 is held on and mounted on the eyeglasses 10 by clamping a lens portion 13L of the eyeglasses 10 using the clip 4 from a front surface side and a back surface side of the eyeglasses 10. The image projection part 5 is constituted of an image forming part 2 which forms an image and radiates scanning beams, and a prism 3 which introduces the scanning beams 6 therein and radiates the scanning beams 6 to a retina of a user. Also in this embodiment, the projection image is introduced to a center portion of an eye from a position on a lateral side of the eye of the user, and is radiated to a retina of the user not shown in the drawing by way of reflection surfaces M1 and M2. The image forming part 2 is positioned at a position obliquely above the eye of the user. Further, a lead line 7 provided for inputting image signals to the image projection part 5 is rotatably mounted on the image forming part 2.

Figure 9A:
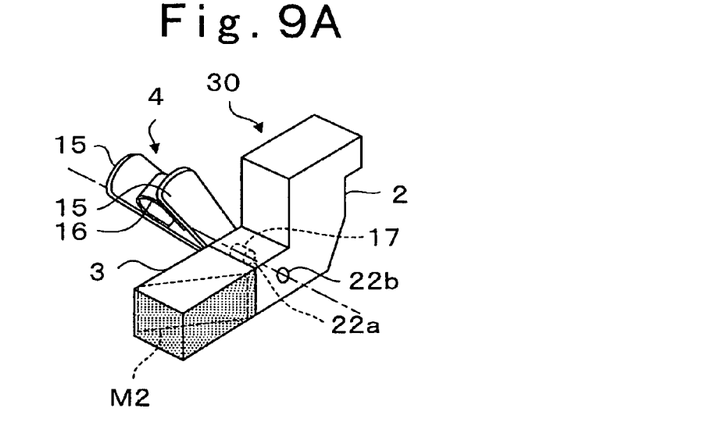
FIG. 9(a) shows the image display device in a state that the image display device is mounted on a left eye side of the eyeglasses of a user.

As shown in FIG. 9(a), the clip 4 is mounted on the image forming part 2 by way of a connecting portion 17. The image forming part 2 includes a rear-side mounting portion 22a and a front-side mounting portion 22b on which the clip 4 is mounted. A reflection surface M2 is formed in the prism 3. Further, the clip 4 is constituted of two clip lugs 15 and a spring 16 which connects two clip lugs 15 to each other, and a stress for clamping a part of a lens portion of the eyeglasses 10 is imparted to two clip lugs 15. The image display device 30 shown in FIG. 7 and FIG. 8 is mounted on a left eye side of the eyeglasses 10 in such a state.

Figure 9B:
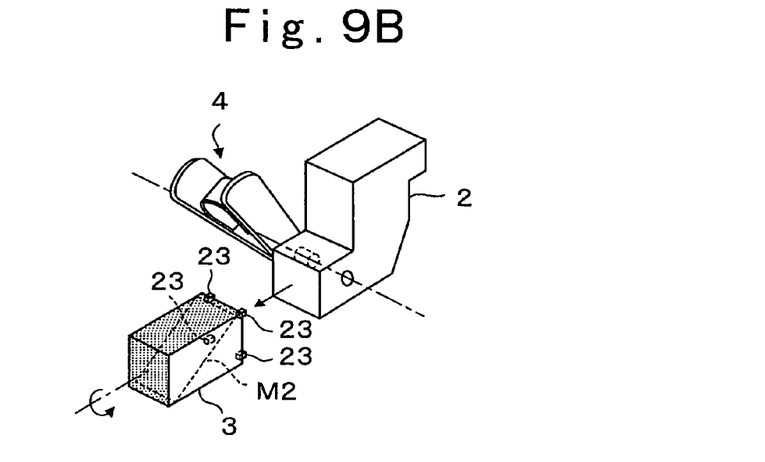
FIG. 9(b) shows the image display device 30 is in a state that a prism is removed from an image forming part 2 and is rotated.
Figure 9C:
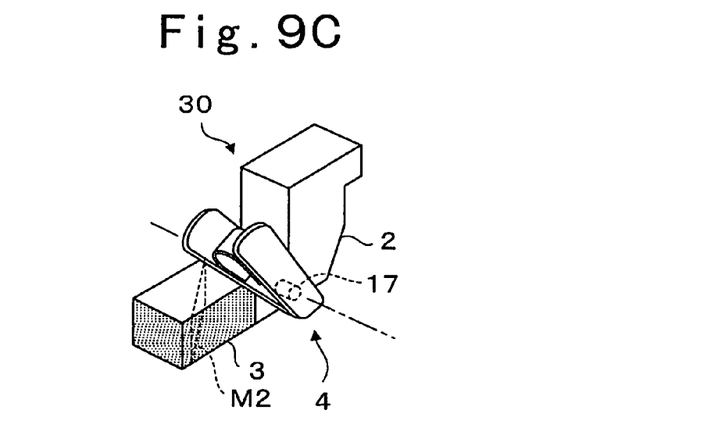
FIG. 9(c) shows the image display device 30 in a state that the image display device 30 is mounted on a right eye side of the eyeglasses of the user.

Next, as shown in FIG. 9(b), the prism 3 is removed from the image forming part 2 and is rotated. The prism 3 and the image forming part 2 are configured to be connectable to each other by four pins 23. As shown in FIG. 9(c), the prism 3 can be rotated by 180° and can be mounted on the image forming part 2. Accordingly, in this embodiment, the prism 3 which is detachably mounted on the image forming part 2 constitutes a switching mechanism. In the embodiment, the prism 3 is configured such that the prism 3 is removed from the image forming part 2, is rotated and, thereafter, the prism 3 is again mounted on the image forming part 2. In place of such exchangeable mounting of the prism 3, the prism 3 may be rotatably mounted on the image forming part 2. Here, a connection mechanism which connects the prism 3 and the image forming part 2 in a rotatable manner constitutes the switching mechanism. It may be also possible to remove the clip 4 from the rear-side mounting portion 22a of the image forming part 2 and to mount the clip 4 on the front-side mounting portion 22b of the image forming part 2. Due to such shifting of mounting of the clip 4, the image display device 30 can be mounted on a right eye side of the eyeglasses 10. Here, the switching mechanism is constituted of the plurality of mounting portions 22a, 22b formed on the image forming part 2 of the image projection part 5 and the clip 4 which is detachably mountable on the mounting portions 22a, 22b.

Figure 10A:
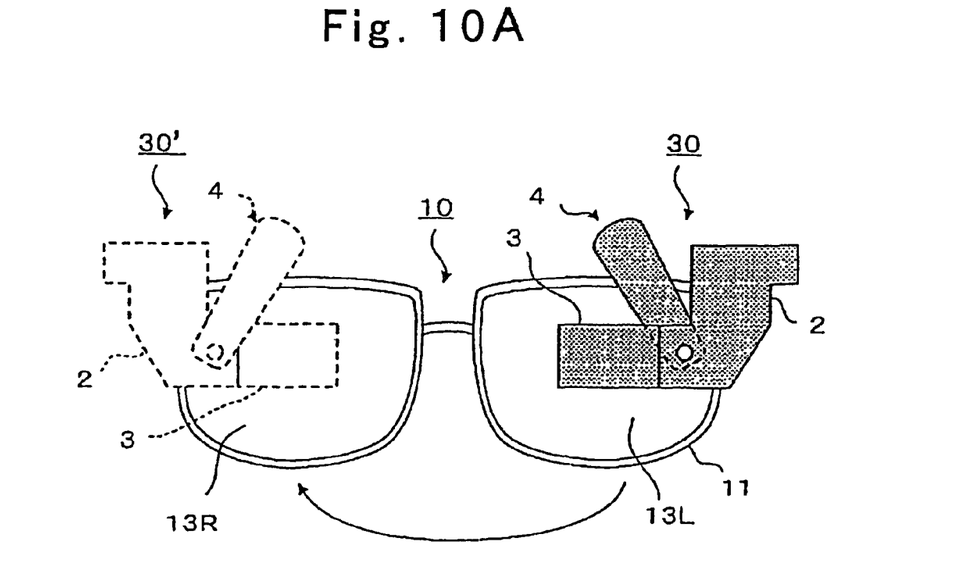
FIG. 10(a) is a schematic front view of the image display device in a state that the image display device is mounted on a left eye side of the eyeglasses 10.
Figure 10B:
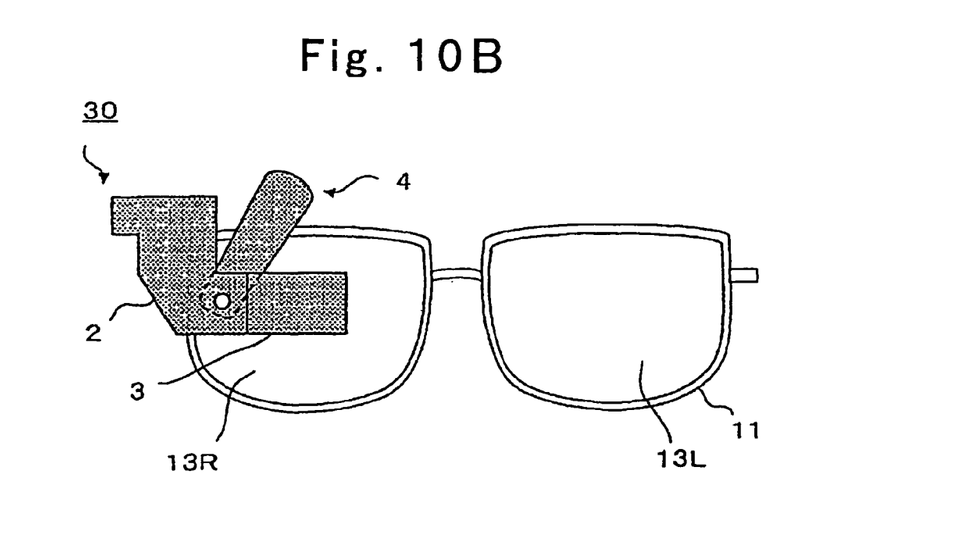
FIG. 10(b) is a schematic front view of the image display device in a state that the image display device is moved to and mounted on a right eye side of the eyeglasses.

In FIG. 10(a), the image display device 30 is mounted on the left eye side of the eyeglasses 10. When the image display device 30 is rotated so that a front side and a rear side of the image display device 30 are reversed and, thereafter, is moved toward the left eye side of the eyeglasses, the image display device 30 assumes the posture indicated by a broken line 30'. Here, the clip 4 is arranged on the front side of the image display device 30. Since the prism 3 has a front surface and a rear surface thereof reversed, a projection image is projected toward a side opposite to an eye of a user. Accordingly, as has been explained in conjunction with FIG. 9, the clip 4 is switchably mounted on the back side of the image forming part 2 from the front side of the image forming part 2, and the prism 3 is removed from the image forming part 2, is rotated by 180°, and is mounted on the image forming part 2. Due to such an operation, it is possible to switch a mounting position of the image display device 30 from the left eye side of the eyeglasses 10 to the right eye side of the eyeglasses 10 and to project an upright image without performing processing for inverting a projection image into an upright image in the image scanning part 8 of the image forming part 2. It is needless to say that a mounting position of the image display device 30 from the right eye side of the eyeglasses 10 to the left eye side of the eyeglasses 10 may be performed in a simplified manner in order substantially equal to the above-mentioned order.

Further, also in this embodiment, by connecting the image forming part 2 and the clip 4 by way of a connecting portion 17 having three degrees of freedom, after mounting the image display device 30 on the eyeglasses 10, it is possible to simply adjust an angle of the image display device 30 relative to the eyeglasses 10. A user can pinch the clip lugs 15 of the clip 4 with his/her fingers and can easily move the image display device 30 to an optimum position on a part of the tens portion, and can adjust an inclination angle of the image projection part 5. By forming an elastic body on portions of the clip 4 which are brought into contact with the lens of the eyeglasses 10, it is possible to prevent the generation of flaws on the lens and, at the same time, it is possible to mount the image display device 30 on the eyeglasses 10 in a stable manner. Further, by arranging a contact portion of the clip 4 with the lens and the connecting portion 17 which connects the clip 4 and the image forming part 2 close to each other, it is possible to mount the image display device 30 on the eyeglasses 10 in a stable manner and, at the same time, the movement and the positional adjustment of the image display device 30 are facilitated.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. An image display device comprising:
    an image projection part that forms an image and projects the image on a retina;
    a switching mechanism included in the image projection part, the switching mechanism changing over a use mode between a mode where the image display device is used in a state that the image display device is mounted on a left eye side of the eyeglasses and a mode where the image display device is used in a state that the image display device is mounted on a right eye side of the eyeglasses; and
    a clip that is rotatably mounted on the image projection part, the clip being configured to clamp a part of a lens portion of eyeglasses from a front surface side and a back surface side of the eyeglass so as to hold the image projection part,
    wherein the switching mechanism is coupled to the clip and is configured to change over the use mode between the mode where the image display device is used in a state that the image display device is mounted on the left eye side of the eyeglasses and the mode where the image display device is used in a state that the image display device is mounted on the right eye side of the eyeglasses by rotating the clip.

2. The image display device according to claim 1, wherein:
    the switching mechanism is constituted of a changeover switch for rotating the image projected by the image projection part, and
    the switch is operated along with the rotation of the clip.

3. An image display device comprising:
- an image projection part that forms an image and projects the image on a retina, the image projection part including an image forming part that forms the image and a prism that projects the image;
- a switching mechanism included in the image projection part, the switching mechanism changing over a use mode between a mode where the image display device is used in a state that the image display device is mounted on a left eye side of the eyeglasses and a mode where the image display device is used in a state that the image display device is mounted on a right eye side of the eyeglasses; and
- a clip that is mounted on the image projection part, the clip being configured to clamp a part of a lens portion of eyeglasses from a front surface side and a back surface side of the eyeglass so as to hold the image projection part,
- wherein the switching mechanism is constituted of the prism that is rotatably or detachably mounted on the image forming part, and is configured to change over the use mode between the mode where the image display device is used in a state that the image display device is mounted on a left eye side and the mode where the image display device is used in a state that the image display device is mounted on a right eye side by rotating the prism by 180°.

4. The image display device according to claim 1, wherein the clip is mounted on the image projection part by way of a connecting portion having movability of three degrees of freedom.

5. The image display device according to claim 1, wherein the clip has an elastic body on contact portions of the clip that are brought into contact with a lens portion in a state that the clip clamps the part of the lens portion.

6. The image display device according to claim 1, wherein the clip is mounted on the image projection part by way of a connecting portion, and the connecting portion is configured to be arranged close to contact portions of the clip that are brought into contact with the lens portion in a state that the clip clamps the part of the lens portion.

7. The image display device according to claim 3, wherein the clip is mounted on the image projection part by way of a connecting portion having movability of three degrees of freedom.

8. The image display device according to claim 3, wherein the clip has an elastic body on contact portions of the clip that are brought into contact with a lens portion in a state that the clip clamps the part of the lens portion.

9. The image display device according to claim 3, wherein the clip is mounted on the image projection part by way of a connecting portion, and the connecting portion is configured to be arranged close to contact portions of the clip that are brought into contact with the lens portion in a state that the clip clamps the part of the lens portion.

10. An image display device comprising:
- an image projection part that forms an image and projects the image on a retina, the image projection part including a plurality of mounting portions where the clip is mountable;
- a switching mechanism included in the image projection part, the switching mechanism changing over a use mode between a mode where the image display device is used in a state that the image display device is mounted on a left eye side of the eyeglasses and a mode where the image display device is used in a state that the image display device is mounted on a right eye side of the eyeglasses; and
- a clip that is mounted on the image projection part, the clip being configured to clamp a part of a lens portion of eyeglasses from a front surface side and a back surface side of the eyeglass so as to hold the image projection part,
- wherein the switching mechanism is coupled to the plurality of mounting portions and is configured to change over the use mode between the mode where the image display device is used in a state that the image display device is mounted on the left eye side and the mode where the image display device is used in a state that the image display device is mounted on the right eye side by changing the mounting position where the clip is mounted.

11. The image display device according to claim 10, wherein the clip is mounted on the image projection part by way of a connecting portion having movability of three degrees of freedom.

12. The image display device according to claim 10, wherein the clip has an elastic body on contact portions of the clip that are brought into contact with a lens portion in a state that the clip clamps the part of the lens portion.

13. The image display device according to claim 10, wherein the clip is mounted on the image projection part by way of a connecting portion, and the connecting portion is configured to be arranged close to contact portions of the clip that are brought into contact with the lens portion in a state that the clip clamps the part of the lens portion.

* * * * *